(12) United States Patent
Hadas et al.

(10) Patent No.: US 11,687,379 B2
(45) Date of Patent: Jun. 27, 2023

(54) MANAGEMENT OF CONTAINERIZED CLUSTERS BY VIRTUALIZATION SYSTEMS

(71) Applicant: RED HAT, INC., Raleigh, NC (US)

(72) Inventors: Arik Hadas, Herzliya (IL); Mordechay Asayag, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 46 days.

(21) Appl. No.: 16/885,158

(22) Filed: May 27, 2020

(65) Prior Publication Data

US 2021/0373965 A1 Dec. 2, 2021

(51) Int. Cl.
G06F 9/455 (2018.01)
G06F 9/50 (2006.01)

(52) U.S. Cl.
CPC ........ *G06F 9/5077* (2013.01); *G06F 9/45558* (2013.01); *G06F 2009/4557* (2013.01); *G06F 2009/45562* (2013.01); *G06F 2209/505* (2013.01)

(58) Field of Classification Search
CPC .............. G06F 9/5077; G06F 9/45558; G06F 2009/45562; G06F 2009/4557; G06F 2209/505
See application file for complete search history.

(56) References Cited

U.S. PATENT DOCUMENTS

| | | | |
|---|---|---|---|
| 7,152,090 B2 | 12/2006 | Amirisetty et al. | |
| 8,990,944 B1 | 3/2015 | Singh et al. | |
| 10,110,418 B2 | 10/2018 | Liang et al. | |
| 10,191,778 B1 | 1/2019 | Yang et al. | |
| 10,389,598 B2 | 8/2019 | Padala et al. | |
| 2009/0125989 A1 | 5/2009 | Flaherty et al. | |

(Continued)

FOREIGN PATENT DOCUMENTS

CN 108108223 A 6/2018

OTHER PUBLICATIONS

Geert Hansen, "Managing Heterogeneous Environments with ManageIQ", https://lwn.net/Articles/680060/, Eklektix, Inc., 5 pages, Mar. 16, 2016.

(Continued)

*Primary Examiner* — Dong U Kim
(74) *Attorney, Agent, or Firm* — Lowenstein Sandler LLP

(57) ABSTRACT

Systems and methods for managing containerized clusters from virtualization management systems. An example method may include identifying one or more cluster entities of a containerized computing cluster, where the containerized computing cluster comprises a plurality of virtual machines running on one or more host computer systems, generating one or more virtualization management entities in the virtualization management system, wherein each virtualization management entity represents a respective cluster entity, receiving a request to perform an operation on a specified virtualization management entity in the virtualization management system, identifying a cluster entity represented by the virtualization management entity, translating, responsive to the request, the request to one or more commands to be performed on the identified cluster entity of the containerized computing cluster, and sending the one or more commands to the containerized computing cluster.

20 Claims, 6 Drawing Sheets

(56) References Cited

U.S. PATENT DOCUMENTS

| | | |
|---|---|---|
| 2012/0185913 A1 | 7/2012 | Martinez et al. |
| 2015/0089031 A1 | 3/2015 | Kalali |
| 2019/0087244 A1 | 3/2019 | Turner |
| 2019/0108049 A1* | 4/2019 | Singh .................. G06F 9/45558 |
| 2021/0311758 A1* | 10/2021 | Cao ....................... G06F 9/5027 |
| 2021/0389970 A1* | 12/2021 | Geng .................. H04L 41/0895 |

OTHER PUBLICATIONS

"Powerful Open Source Virtualization", https://www.ovirt.org/develop/release-management/features/virt/vm-lifecycle-with-kubevirt.html, oVirt, , 6 pages, 2013.

* cited by examiner

MANAGEMENT OF CONTAINERIZED CLUSTERS BY VIRTUALIZATION SYSTEMS

TECHNICAL FIELD

The present disclosure is generally related to system management, and more particularly, to management of container computing platforms by virtualization systems.

BACKGROUND

Cluster computing environments can provide computing resources, such as host computer systems, networks, and storage devices that can perform data processing tasks and can be scaled to handle larger tasks by adding or upgrading resources. Virtualization techniques can be used to create multiple "virtual machines" on each physical host computer system, so the host computer systems can be used more efficiently and with greater flexibility. A hypervisor may run on each host computer system and manage multiple virtual machines. Such virtualization techniques thus provide abstractions of the physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
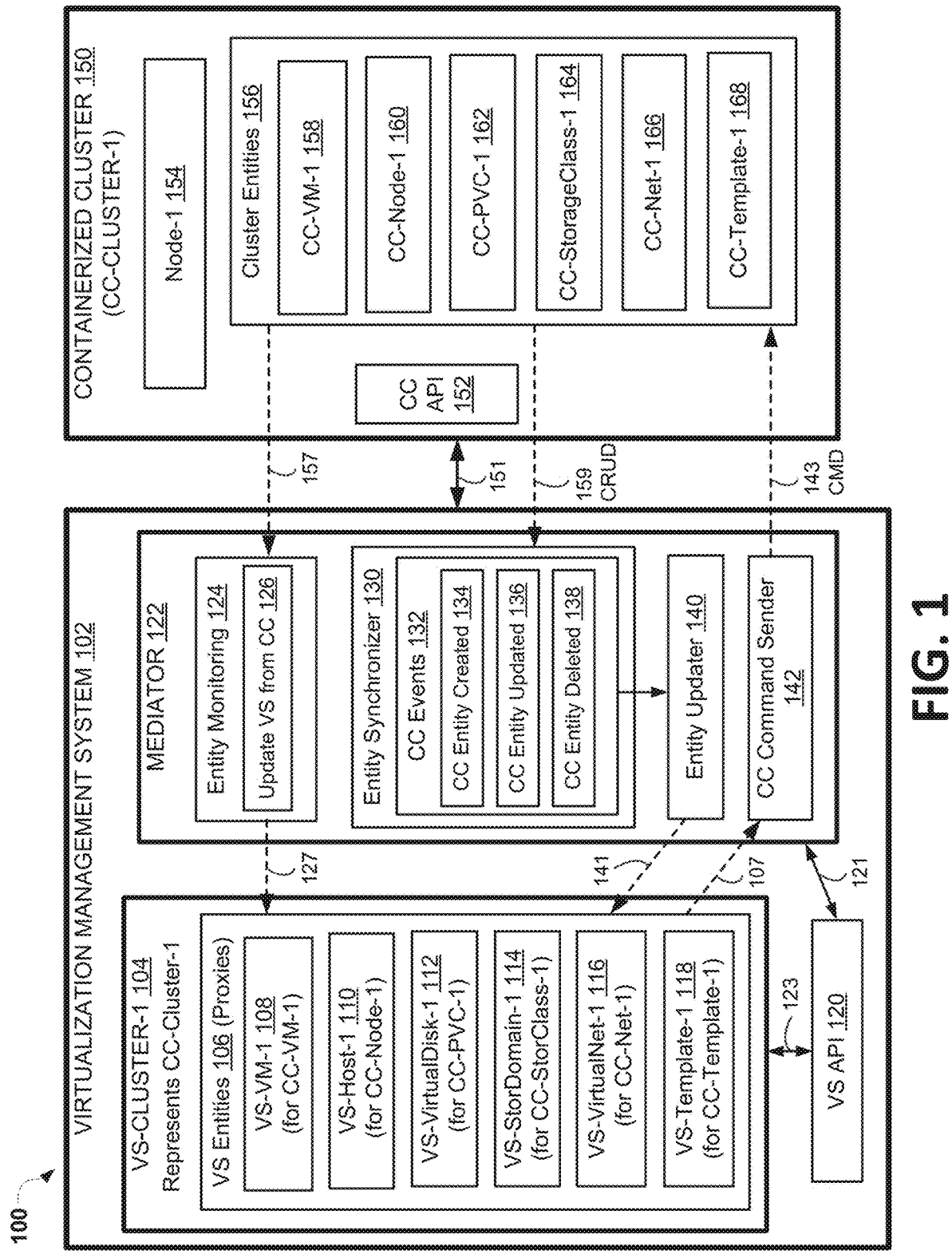
FIG. 1 depicts a block diagram of an example virtualization management system that manages a containerized cluster, in accordance with one or more aspects of the present disclosure.

Described herein are systems and methods for managing containerized clusters from a virtualization management system. In general, a containerized cluster may be a cluster of physical or virtual host machines that run containerized applications. The containerized cluster may include entities that represent resources in the cluster, such as virtual machines, nodes, persistent volumes, and networks. A containerized application may run in association with a container, which may handle infrastructure-related tasks such as deployment of the application for operation. The container may include the application and the application's dependencies, which may include libraries and configuration information. A virtualization management system may be a system management tool that simplifies administrative tasks involved in operating managed resources, such as virtual machines. The virtualization management system may provide management interfaces for performing operations on the managed resources. However, existing virtualization management systems do not provide management interfaces for managing containerized clusters. Although a containerized cluster may provide a containerized cluster management user interface and Application Programming Interfaces ("APIs"), a containerized cluster's management user interface may be different from the virtualization management system interfaces that are already known to users. Users would thus need to be trained to use the containerized cluster's management user interface. A containerized cluster's Application Programming Interface ("API") may be different from the virtualization management system API used by existing automation scripts, so automation scripts may need to be modified to use the containerized cluster API. Further, certain system management features expected by users or automation scripts may be missing from the containerized cluster's management interface. For these reasons, users and organizations may find it difficult to make the transition to using containerized clusters.

Aspects of the present disclosure address the above-noted and other deficiencies by providing technology that enables a virtualization management system to access a containerized cluster via existing user interfaces and application programming interfaces of the virtualization management system, so users and automation scripts need not use an interface different from that of the virtualization management system to manage the containerized cluster. In particular embodiments, a management interface mediator may map the containerized cluster's entities, such as virtual machines, nodes, persistent volumes, and networks to corresponding entities in the virtualization management system that would act as proxies with respect to the cluster entities. The proxy entities may appear similar to the ordinary (non-proxy) entities in the virtualization management system, and may represent resources such as virtual machines, hosts, virtual disks, virtual networks, or virtual machine templates in the virtualization management system. Each proxy entity may be, for example, compatible with a virtualization management entity interface of the virtualization management system, e.g., may implement an interface or protocol specified by the virtualization management system so that the proxy entity is compatible with the same interface as the ordinary (non-proxy) virtualization management entities. The proxy entities may include parameters and state information of the corresponding cluster entities. The parameters and state information may be, for example, a name of the cluster entity and one or more entity-specific parameters, such as a memory size for a virtual machine entity, a network address for a virtual network entity, or the like.

The management interface mediator may synchronize the virtualization management system's entities with the containerized cluster's entities so that each entity in the containerized cluster has a corresponding proxy entity in the virtualization management system. Thus, virtualization management system entities may be dynamically created, updated, or deleted by the mediator at runtime in response to creation, update, or deletion of corresponding cluster entities. Further, operations may be performed on the proxy entities via the virtualization management system to manage the corresponding resources of the containerized cluster. For example, a virtual machine in the containerized cluster may be restarted by performing a restart operation on a proxy entity in the virtualized management system that represents the virtual machine. The mediator may also forward requests to perform operations on entities in the virtualization management system, such as creating, starting, stopping or deleting virtual machines, to the corresponding entities in the containerized cluster, on which the operations may be performed.

Advantages of the present disclosure include, but are not limited to, the ability to use the virtualization management system's interfaces to manage the containerized cluster. Thus, for example, users familiar with the user interface of the virtualization management system can manage the entities of the containerized cluster without learning to use the containerized cluster's management user interface. Similarly, existing automation scripts or program code that is compatible with the virtualization management system can manage entities of the containerized cluster without being modified, since the application programming interface of the virtualization management system may be used to access entities of the containerized cluster as virtualization management system entities.

Various aspects of the above referenced methods and systems are described in details herein below by way of examples, rather than by way of limitation. The examples provided below discuss techniques for interacting with containerized cluster entities using interfaces of a virtualization management system.

FIG. 1 depicts a block diagram of an example virtualization management system 102 that manages a containerized computing cluster 150 ("containerized cluster"), in accordance with one or more aspects of the present disclosure. A computing environment 100 that uses virtualization may have numerous resources, including logical objects and their corresponding physical hardware. The virtualization management system 102 may be used to simplify administrative tasks involved in operating the computing environment 100. For example, the virtualization management system 102 may be used to add additional host computer systems to a containerized cluster 150 and monitor their status. The virtual and physical resources of the virtualization management system 102 may include virtual machines, host computer systems, virtual disks, virtual networks, and so on. These resources may be represented by virtualization management entities 106. The virtualization management system 102 may provide user interfaces that users such as system administrators may use to manage the virtualization management entities 106. The RED HAT VIRTUALIZATION management system is an example of a virtualization management system 102.

Applications can be developed using containers that handle infrastructure-related tasks such as deployment of applications for operation. A container may include the application and the application's dependencies, such as libraries and configuration information. The term "containerized application" may refer to a container that contains the application and the application's dependences. A containerized application may be run on a host computer system that has a suitable operating system and runtime engine. Container computing platforms can automate container operations, such as deploying, managing, and scaling containerized applications. For example, a container computing platform may schedule and run containers on clusters of physical or virtual machines and provide system management tools to simplify the administration of the clusters. The term "containerized cluster" may refer to a cluster that may run containerized applications using a container computing platform. A containerized cluster 150 may represent a set of host computing devices and associated resources such as storage devices. The containerized cluster 150 may include virtual and physical resources, which may be represented in the containerized cluster as cluster entities 156. The cluster entities 156 may include virtual machines, cluster nodes, persistent volumes, virtual networks, and so on. The KUBERNETES platform is an example of a container computing platform. The containerized cluster(s) 150 on which the container computing platform runs may be accessible via a network such as the Internet, and may be provided as cloud services. Thus, the cluster entities 156 may execute in a cloud environment.

As depicted in FIG. 1, a computing environment 100 includes the virtualization management system 102 and the containerized cluster 150. The containerized cluster 150 is named "CC-CLUSTER-1." The abbreviations "VS" and "CC" used in FIG. 1 refer to "virtualization management system" and "containerized cluster," respectively. The virtualization management system 102 may include a virtualization management cluster 104 (named "VS-CLUSTER-1") which represents the containerized cluster 150 ("CC-CLUSTER-1"). The virtualization management cluster 104 may represent a set of host computing devices ("host machines"), storage devices, and other virtual and physical resources (not shown).

The virtualization management cluster 104 may be created by a management interface mediator 122, e.g., when the virtualization management system 102 initializes, or when the containerized cluster 150 is discovered (if the containerized cluster 150 is created when the virtualization management system 102 is running). The virtualization management cluster 104 includes virtualization management system entities 106 ("VS entities") that represent containerized cluster entities 156. The VS entities 106 and cluster entities 156 may include data and program code, and may represent virtual or physical resources. The VS entities 106 may be created by the management interface mediator 122 as described below.

The containerized cluster 150 may include one or more nodes 154 ("Node-1") and the containerized cluster entities 156. The cluster entities 156 may include a virtual machine entity CC-VM-1 158, a node entity CC-Node-1 160 (which may represent Node-1 154), a persistent volume claim entity CC-PVC-1 162, a storage class entity CC-Storage-Class-1 164, a network entity CC-Net-1 166, and a virtual machine template entity CC-Template-1 168. Although not shown, there may be multiple containerized clusters 150, multiple nodes 154, and multiple cluster entities 156 of each type (e.g., another virtual machine entity CC-VM-2), or cluster entities of other types (e.g., to represent other types of virtual or physical resources). Although not shown, there may be multiple containerized clusters 150, and there may be cluster entities 156 of each type (e.g., another virtual machine entity CC-VM-2), or cluster entities of other types (e.g., to represent other types of virtual or physical resources, such as a persistent volume CC-PV-1).

Each of the VS entities 106 may correspond to a containerized cluster entity 156. The VS entities 106 include a virtual machine entity VS-VM-1 108 (corresponding to CC-VM-1 158), a host entity VS-Host-1 110 (corresponding to CC-Node-1 160), a virtual disk entity VS-VirtualDisk-1 112 (corresponding to CC-PVC-1 162), a storage domain entity VS-StorDomain-1 114 (corresponding to CC-StorageClass-1 164), a virtual network entity VS-VirtualNet-1 116 (corresponding to CC-Net-1 166), and a virtual machine template entity VS-Template-1 118 (corresponding to CC-Template-1 168). Although not shown, there may be multiple clusters 104, and multiple VS entities 106 of each type (e.g., another virtual machine entity VS-VM-2), or VS entities of other types (e.g., to represent other types of virtual or physical resources). Further, one or more of the VS entities 106 may correspond to a cluster entity 156 of a different type. For example, the virtual disk entity VS-VirtualDisk-1 112 may correspond to a persistent volume cluster entity CC-PV-1 (not shown).

In particular embodiments, the management interface mediator 122 may interact with the virtualization management system 102 via a virtualization management API 120 through communication paths 121 and 123. The mediator 122 may interact with the containerized cluster 150 via a containerized cluster API ("CC API") 152 through a communication path 151. The communication paths may be, e.g., inter-machine network communication connections (as in the case of path 151 in this example) or intra-machine communication (as in the case of paths 121, 123 in this example).

The management interface mediator 122 may include an entity monitoring component 124, which may include an updater component 126 that queries the containerized cluster 154 via the CC API 152 to identify the set of cluster entities 156. The updater component 126 may receive a set of cluster entities 156 via the CC API 152 (as shown by arrow 157; note that arrow 157 indicates the source and destination of the command, and it should be understood that the command may be sent via an API or other interface). The monitoring component 124 may monitor dynamic properties of the cluster entities 156 by requesting the CC API 152 to send information describing the dynamic properties of each cluster entity 156. The dynamic properties may include the identity of the node 154 a virtual machine runs on, the identity of a user that is logged in to a virtual machine, or statistics related to the cluster entity 156, such as the amount of free memory on a node.).

The management interface mediator 122 may also include an entity synchronizer 130 that listens for events from the containerized cluster 150 via the CC API 152. The entity synchronizer 130 may monitor lifecycle events of the cluster entities 156 by requesting the CC API 152 to send CC events 132 describing events in the lifecycles of the cluster entities 156, such as the creation, deletion, and update of each cluster entity 156. The CC events 132 may specify one or more system properties of each cluster entity 156, such as the name of a node, the number of virtual CPUs used by a virtual machine, and so on. The entity synchronizer 130 may update the set of VS entities 106 so that the set of VS entities 106 corresponds one-to-one with the set of cluster entities 156. The entity synchronizer 130 may receive CC events 132 (as shown by arrow 159) from the CC API 152. The received CC events 132 may include a CC Entity Created event 134 indicating that a cluster entity 156 has been created, a CC Entity Updated event 136 indicating that a cluster entity has been updated, or a CC Entity Deleted event indicating that a cluster entity 156 has been deleted from the set of cluster entities 156. Each CC Entity Updated event 136 may specify one or more updated system properties of a corresponding cluster entity 156, such as the node's name (e.g., when the node has been renamed), the number of virtual CPUs of a virtual machine (e.g., when the number has been changed), and so on. The entity synchronizer 130 may invoke an entity updater 140 to update the set of VS entities 106 as specified by the CC events 132 (as shown by arrow 141). For example, when a CC Entity Created event 134 is received, the entity synchronizer 130 may invoke the entity updater 140 to create a new entity in the VS entities 106 having parameters (e.g., name and other entity-specific parameters) that are received in the CC events 132. The created VS entities 106 may have the same values as corresponding parameters on the cluster entity 156 for which the CC event 132 was sent by the CC API 152. As another example, when a CC Entity Updated event 136 is received specifying that a "number of virtual CPUs" system property of CC-VM-1 158 has changed to 16, the entity synchronizer 130 may invoke the entity updater 140 to set the value of a corresponding "number of virtual CPUs" system property of the corresponding virtual machine VS-VM-1 108 to 16.

The management interface mediator 122 may include a CC command sender 142, which may receive operation requests associated with the VS entities 106 (as shown by arrow 107; note that arrow 107 indicates the source and destination of the command, and it should be understood that the command may be sent via an API or other interface). The virtualization management system 102 may send the operation requests to the CC command sender 142 (e.g., through an entity synchronizer API) in response to administrative commands received by the virtualization management system 102. The operations may be operations performed on the VS entities 106. The operations may include, for example, operations to create, run, migrate, stop, restart, or delete specified virtual machines. For example, a user or automation script may request that a new virtual machine be created. In response to the user's request, the virtualization management system 102 may send a request to create a new virtual machine to the CC command sender 142. The CC command sender 142 may translate the request to create a virtual machine to a "create VM" command to be sent to the CC API 152. The "create VM" command may be a command to the CC API 152 to cause a virtual machine to be created in the containerized cluster 150. The CC command sender 142 may send the "create VM" command to the CC API 152 via the link 151 (as shown by arrow 143). Parameters for the command may be received in the request sent to the CC command sender 142. The CC command sender 142 may include the parameters in the command sent to the CC API 152. For example, the memory size limits and virtual disks to be used with the new virtual machine may be specified in the request sent to the CC API 152 to create the virtual machine. The CC API 152 may receive the command from the virtualization management system 102 and perform the operation specified by the command. For example, the CC API 152 may cause the container computing platform to create a new virtual machine in the containerized cluster 150 having parameters specified in the "create VM" command.

As a result of creating the virtual machine, a cluster entity 156 may be created to represent the virtual machine (e.g., CC-VM-2 (not shown)). In response to creation of the cluster entity 156, the CC API 152 may send a CC Entity Created event 134 indicating that CC-VM-2 has been created, and the entity synchronizer 130 may receive the CC Entity Created event 134 (as shown by arrow 159). The entity updater 140 may create a new VS entity 106, e.g., VS-VM-2, to represent CC-VM-2 (as shown by arrow 141). The newly-created VS-VM-2 entity may then appear in the virtualization management system 102 user interface, application programming interface, or other interface.

A request to perform an operation on an existing VS entity 106 may also be processed by the CC command sender 142, which may translate the operation to a command to perform a corresponding operation on the corresponding cluster entity 156 in the containerized cluster 150. These operations may include operations on previously-created virtual machines, such as operations to start, stop, restart, migrate, or delete a virtual machine. The CC command sender 142 may send the translated commands to the CC API 152 (as shown by arrow 143). For example, a user or automation script may request the virtualization management system 102 to migrate a specified virtual machine (e.g., "VS-VM-1") using specified parameters in the virtualization system cluster 104. The virtualization management system 102 may, in response, send a request to perform a "migrate VM" operation to the CC command sender 142 via VS API 120 (as shown by arrow 107; note that arrow 107 indicates the source and destination of the command, and it should be understood that the command may be sent via the VS API 120). The request may include the identity of the specified VS VM (e.g., VS-VM-1) and the specified parameters. The CC command sender 142 may translate the "migrate VM" operation to a "migrate VM" command and translate the identity of the VS entity 106 ("VS-VM-1") to the identity of the cluster entity 156 ("CC-VM-1") associated with the VS entity 106. The CC command sender 142 may add to the command the translated identity of the VM to be migrated ("CC-VM-1") and parameters (which may be translated from the specified parameters if needed) in a format acceptable to the CC API 152. The CC command sender 142 may then send the "migrate VM" command with the identity of the VM and the parameters to the CC API 152. The CC API 152 may receive the command and parameters, and cause the command to be performed on the containerized cluster 150. For example, the CC API 152 may request that the container computing platform migrate the virtual machine specified in the command ("CC-VM-1") using the parameters specified in the command.

As described above, the management interface mediator 122 can enable the virtualization management system 102 to manage the cluster entities 156 of the containerized cluster 150 by providing, in the virtualization management system 102, corresponding virtualization management entities 106 that represent the cluster entities 156. The virtualization management system's interfaces, e.g., its user interface or application programming interface ("API"), may be used to manage the cluster entities 156 of the containerized cluster 150 because the cluster entities 156 are represented as the virtualization management entities 106. The virtualization management entities 106 that represent cluster entities may also be referred to herein as "proxy entities" 106 for explanatory purposes. The virtualization management system 102 may also include ordinary entities (not shown) that do not represent cluster entities 156. The proxy entities 106 may include parameters or other information copied from the corresponding cluster entities 156, such as the name of the entity, a network address of a virtual machine, and so on. A proxy entity 106 that has been configured with appropriate parameters and state information from the corresponding cluster entity 156 may provide the parameters and state information, when requested, to the virtualization management system 102 through an interface defined in the virtualization management system 102 (not shown). Thus the virtualization management system 102 may present the proxy entity 106 in user interfaces, and provide access to it via application programming interfaces, along with ordinary entities, as if it were an ordinary entity.

The management interface mediator 122 may synchronize the VS entities 106 with the cluster entities 156 by, for example, using the entity synchronizer 130 to query the CC API 152 for a set of existing cluster entities 156 and, for each existing cluster entity, creating a VS entity 106 (which may be understood as a proxy for the corresponding cluster entity 156). The mediator 122 may further delete each VS entity 106 that does not have an associated existing cluster entity 156. For example, the mediator 122 may delete each such VS entity from the virtualization management system 102. Subsequently, to maintain synchronization between the virtualization management system 102 and the containerized cluster 150, the entity synchronizer 130 may listen for and receive CC events 132 from the containerized cluster 150 indicating that cluster entities 156 have been created, updated, or deleted. For each such event 132, the entity updater 140 may perform the corresponding action in the virtualization management system 102, e.g., by creating, updating, or deleting the VS entity 102 that is associated with the cluster entity 156 identified in the event 132.

The virtualization management system 102 may recognize VS entities 106, which may be understood as proxies, as being different from ordinary entities when appropriate, e.g., to avoid performing actions that are not applicable to proxy entities, and to delegate operations that are to be performed by the cluster entities 156 to the containerized cluster 150. Such operations may include, for example, creating, starting, or stopping a virtual machine, as described above with reference to the CC command sender 142. For example, when a user or automation script uses the virtualization management system 102 to request that a new virtual machine be created, if the virtualization management entity that represents the virtual machine is a proxy entity 106, the mediator 122 may construct a command to create a new virtual machine. The command may include parameter values such as the root disk for the new virtual machine, and so on. The mediator 122 may send the command to the containerized cluster 150 to cause a new virtual machine to be created, as described above with reference to the CC command sender 142.

Since the virtualization management system entities 106 may be synchronized with the corresponding cluster entities 156, and operation requests are forwarded from the virtualization management system entities to the corresponding cluster entities (e.g., by the CC command sender 142), the user interface (UI) and application programming interface (API) of the virtualization management system 102 can be used to manage the containerized cluster 150. Thus, for example, users that are familiar with the UI of the virtualization management system 102 can manage the containerized cluster 150 without learning its UI and administrative functions. Further, existing automation scripts or program code that is compatible with the virtualization management system 102 can manage the containerized cluster 150 without modification.

Figure 2:
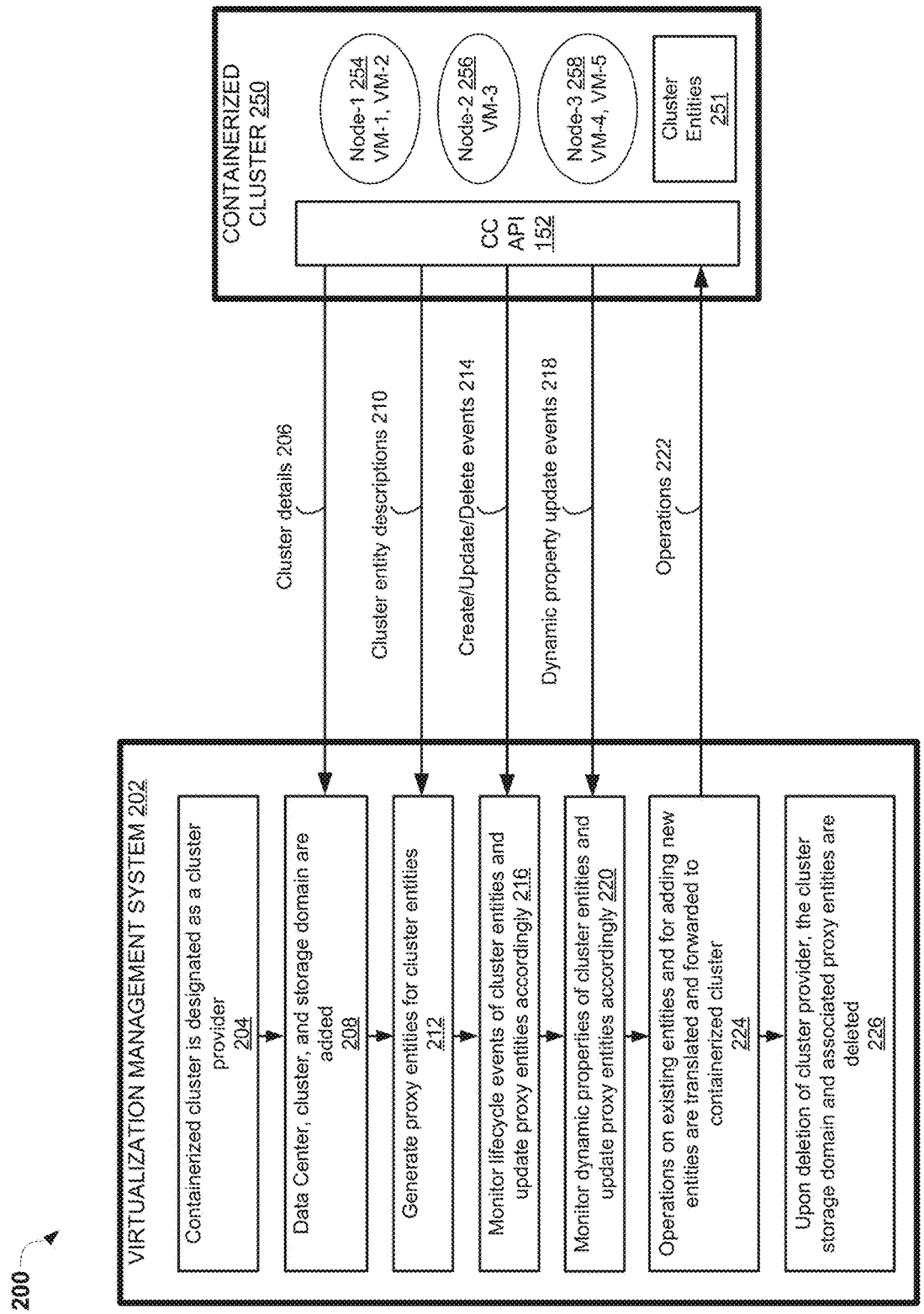
FIG. 2 depicts an interaction diagram illustrating management of a containerized cluster by a virtualization management system, in accordance with one or more aspects of the present disclosure.

FIG. 2 depicts an interaction diagram 200 illustrating management of a containerized cluster 250 by a virtualization management system 202, in accordance with one or more aspects of the present disclosure. The interaction diagram 200 includes blocks that may be understood as being similar to blocks of a flow diagram of a method. Thus, if performed as a method, the blocks shown in the interaction diagram 200 (such as the blocks in the virtualization management system 202 that perform operations), the method and each of its individual functions, routines, subroutines, or operations may be performed by one or more processors of a computer device executing the method.

The blocks shown in virtualization management system 202 may be performed by processing devices of a server device or a client device (e.g., a host computer system) of the system 200. The containerized cluster 250 includes the CC API 152 and three nodes 254, 256, 258. Two virtual machines VM-1 and VM-2 are running on node 254 ("Node-1"), one virtual machine VM-3 is running on node 256 ("Node-2"), and two virtual machines VM-4 and VM-5 are running on node 258 ("Node-3"). The containerized cluster 250 also includes one or more cluster entities 251, which may correspond to the cluster entities 156 of FIG. 1.

At block 204, a host computer system may designate the containerized cluster 250 as a cluster provider, so that the virtualization management system 202 can interact with the containerized cluster 250 as described herein. The CC API 152 of the containerized cluster 250 may send cluster details 206 to the virtualization management system 202, and at block 208, the host computer system may receive the cluster details 206 and add a data center, cluster, and storage domain to the virtualization management system 202 as specified by the cluster details 206. The containerized cluster 250 may send cluster entity descriptions 210 describing the cluster entities 251 to the virtualization management system 202. The host computer system may receive the cluster entity descriptions 210 at block 212 and generate proxy entities for the cluster entities 251 in accordance with the cluster entity descriptions 210. The cluster entities 251 in the containerized cluster 250 may include node entities for Node-1, Node-2, and Node-3, and virtual machine entities for VM-1 through VM-5 in this example.

The host computer system may monitor lifecycle events of the containerized cluster 250 and receive lifecycle events, which may include create, update, or delete events 214, at block 216. The host computer system may also update the proxy entities according to the lifecycle events and system properties specified in the lifecycle events at block 216. The host computer system may monitor dynamic property update events 218 at block 220. The host computer system may also update the proxy entities according to the dynamic property events at block 220.

The host computer system may receive requests in the virtualization management system 202 to perform one or more operations at block 224. The host computer system may translate the requests to form translated operations 222 in a format acceptable to the CC API 152, and forward the translated operations 222 to the CC API 152 at block 224. The CC API 152 may receive the translated operations 222 and perform the translated operations on the existing or new entities associated with the translated operations 222. Upon deletion of the cluster provider in the virtualization management system 202, the host computer system may delete the storage domain and associated proxy entities at block 226. The cluster provider may be deleted, for example, when the system 202 is being shut down or restarted, or at other times.

Figure 3:
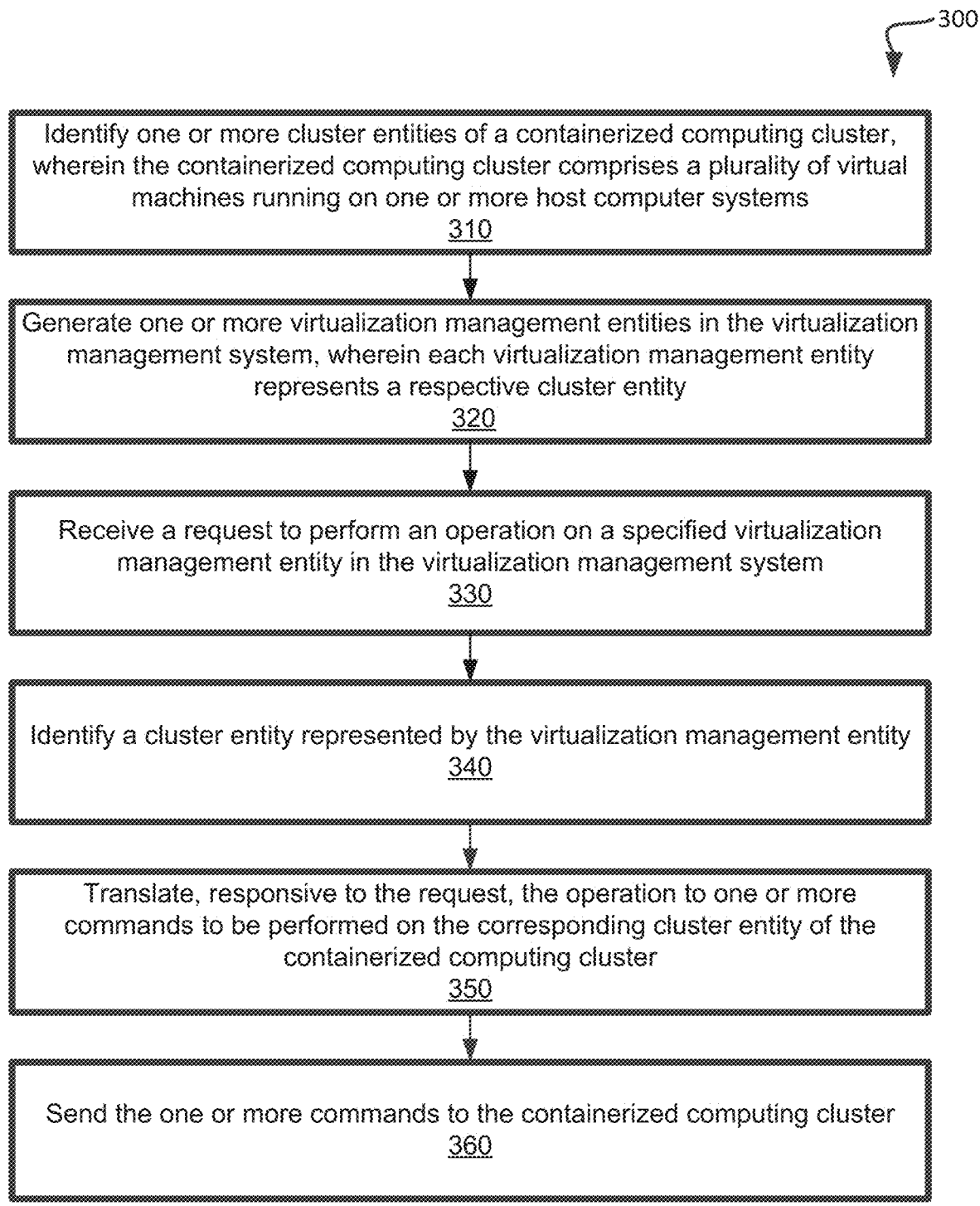
FIG. 3 depicts a flow diagram of an example method for generating virtualization management entities to represent cluster entities of a containerized cluster and translating requested operations on virtualization management entities, in accordance with one or more aspects of the present disclosure.

FIG. 3 depicts a flow diagram of an example method for generating virtualization management entities to represent cluster entities of a containerized cluster and translating requested operations on virtualization management entities, in accordance with one or more aspects of the present disclosure. Method 300 and each of its individual functions, routines, subroutines, or operations may be performed by one or more processors of a computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by at least a portion of mediator 122, e.g., entity monitoring 124, entity synchronizer 130, entity updater 140, and CC command sender 142 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 300 may be performed by processing devices of a host computer system of virtualization management system 102 and may begin at block 310. At block 310, a host computer system may identify one or more cluster entities of a containerized cluster 150. The containerized cluster may include virtual machines running on one or more host computer systems. At block 320, the host computer system may generate one or more virtualization management entities 106 in the virtualization management system. Each virtualization management entity 106 may represent a respective cluster entity 156. For example, each virtualization management entity 106 may be associated with a respective cluster entity 156. The association may be implemented by, for example, storing the identity of a respective cluster entity 156 in a corresponding virtualization management entity 106. Additionally or alternatively, a virtualization management entity 106 may be associated with the respective cluster entity 156 by a lookup table stored in memory. At block 330, the host computer system may receive a request to perform an operation on a specified virtualization management entity 106 in the virtualization management system 102. The specified virtualization management entity may be specified in the request, for example. At block 340, the host computer system may identify a cluster entity 156 represented by the virtualization management entity 106. The cluster entity may be identified by, for example, determining whether the virtualization management entity is associated with a corresponding cluster entity of the containerized cluster 150 (e.g., the association has previously been established). If so, then the identified cluster entity may be the corresponding cluster entity. The association may be understood as indicating that the virtualization management entity 106 is a proxy for the associated cluster entity 156. At block 350, the host computer system may translate, responsive to the request, the operation to one or more commands to be performed on the corresponding cluster entity of the containerized cluster.

As an example, the operation to be translated may be an operation to create, run, migrate, stop, restart, or delete a specified virtual machine, such as VS-VM-1 108. The request may include the operation and one or more parameters associated with the operation, such as the identity (e.g., name) of a VS entity 106 on which the operation is to be performed. Block 350 may translate the operation and parameters to a corresponding operation and parameters to be performed in the containerized cluster 150. If the operation is a "stop-vm" operation that specifies VS-VM-1 108 as the virtual machine to be stopped, then block 350 may translate the "stop-vm" operation to one or more containerized cluster commands to stop the corresponding virtual machine in the containerized cluster 150 that is represented by the specified virtual machine (of the virtualization management system 102). As an example, the corresponding command to stop a VM in the containerized cluster 150 may be named "shutdown-vm." The corresponding virtual machine in the containerized cluster 150 may be CC-VM-1 158 in this example. The virtual machine parameter VS-VM-1 is translated to CC-VM-1 in this example. The example command "stop-vm VS-VM-1" is thus translated to "shutdown-vm CC-VM-1" in this example. At block 360, the host computer system may send the one or more commands to the containerized cluster 150. For example, the host computer system may send the command "shutdown-vm CC-VM-1" to the CC API 152 of the containerized cluster 150. Responsive to completing the operations described herein above with references to block 360, the method may terminate.

Figure 4:
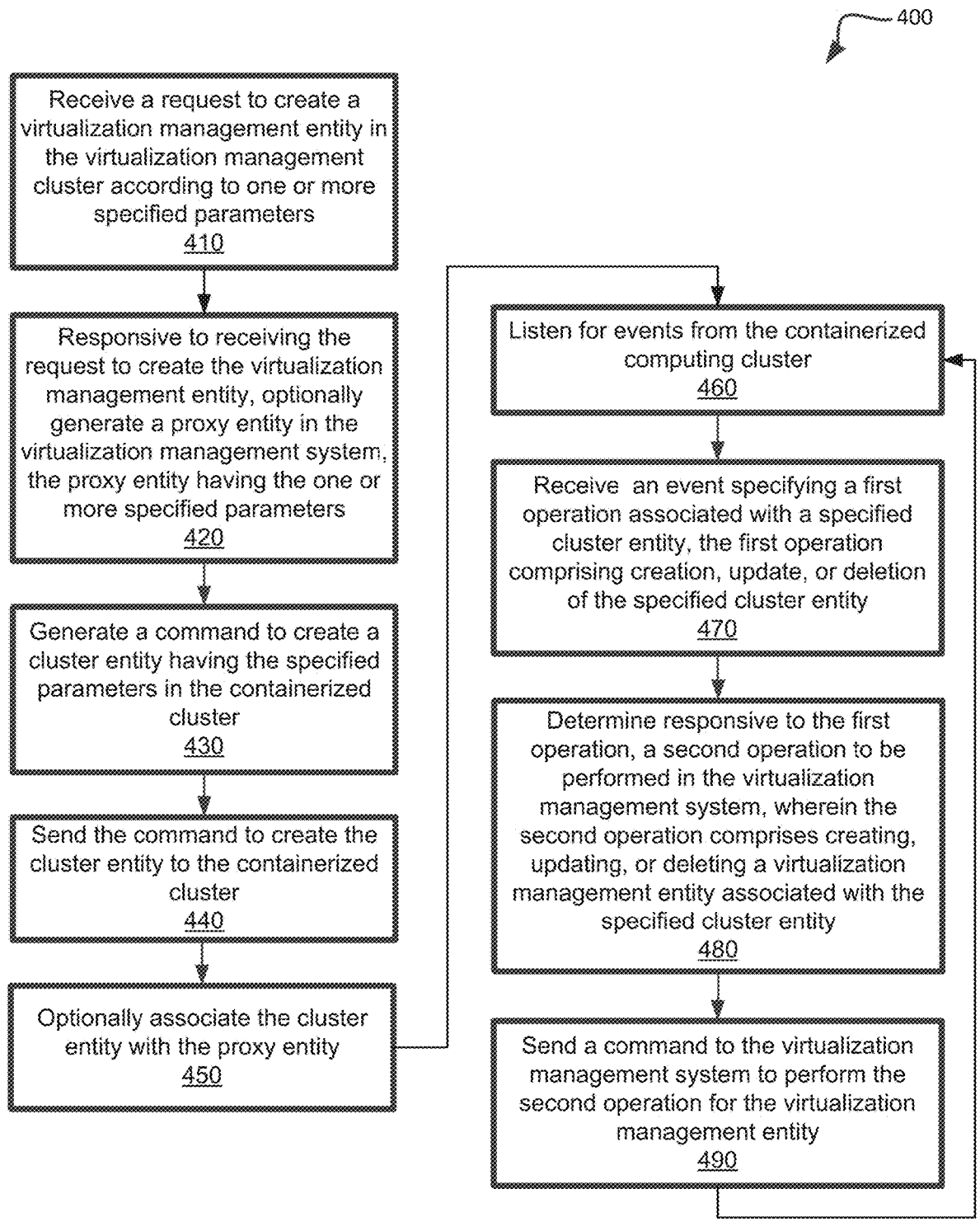
FIG. 4 depicts a flow diagram of an example method for processing a request to create a virtualization management entity, listening for events from a containerized cluster, and updating a set of virtualization management entities that correspond to a set of cluster entities, in accordance with one or more aspects of the present disclosure.

FIG. 4 depicts a flow diagram of an example method for processing a request to create a virtualization management entity, listening for events from a containerized cluster, and updating a set of virtualization management entities that correspond to a set of cluster entities, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by at least a portion of mediator 122, e.g., entity monitoring 124, entity synchronizer 130, entity updater 140 CC, or command sender 142 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 400 may be performed by processing devices of a host computer system of virtualization management system 102 and may begin at block 410. At block 410, the host computer system may receive a request to create a virtualization management entity 106 in a virtualization management cluster 104 (of the virtualization management system 102) according to one or more specified parameters. At block 420, the host computer system may, responsive to receiving the request to create the virtualization management entity 106, optionally generate a proxy entity in the virtualization management system. Generating a proxy entity at block 420 may be optional because a proxy entity may subsequently be generated in response to a command sent back to the virtualization management system at block 490, as described below. A proxy entity may be generated at block 420 if, for example, it is desired that the proxy entity exist while the subsequent steps (e.g., 430-490) are being performed. For example, a proxy entity created at step 420 may indicate to users or API clients that the request to create the virtualization management system is being processed. The proxy entity may have the one or more specified parameters specified for the virtualization management entity 106. At block 430, the host computer system may generate a command to create a cluster entity having the specified parameters in the containerized cluster. To generate the command to create the cluster entity, the host computer system may translate the parameters from the virtualization management system to corresponding parameters that are compatible with the containerized cluster. At block 440, the host computer system may send the command to create the cluster entity to the containerized cluster.

At block 450, the host computer system may optionally associate the cluster entity with the proxy entity. The association may be performed at block 450 if a proxy entity was generated at block 420. The association may be performed by, e.g., creating an association between the cluster entity and the proxy entity in a data structure such as a mapping table, or storing the identity of the cluster entity in the proxy entity. Since a new cluster entity has been created, an event indicating that a new cluster entity has been created may be generated and sent by the containerized cluster 150 (e.g., by the CC API 152) to the virtualization management system 102, as described below with reference to blocks 460-490. As described below, the virtualization management system 102 may receive the event and generate a proxy node 106 that represents the newly-created cluster entity. Although this disclosure describes processing a request to create a virtual management entity and generating a corresponding cluster entity, any suitable operations, such as deleting or updating a virtual management entity, may be received from the virtualization management system, and translated to corresponding commands to perform corresponding operations in a containerized cluster.

Block 460 (and subsequent blocks 470-490) may be performed after block 450, or, alternatively, subsequent to blocks 310 and 320 of FIG. 3, or at other suitable time (e.g., when a mediator 122 of the virtualization management system 102 is initialized). At block 460, the host computer system may listen for events from the containerized cluster 150, e.g., by sending a request to the CC API 152 to receive notification of events 132 that occur when a cluster entity 156 is created, updated, or deleted in the containerized cluster 150 (e.g., "CRUD" events). At block 470, the host computer system may receive, from the containerized cluster 150 (e.g., via the CC API 152), an event specifying a first operation associated with a specified cluster entity 156. The first operation may be, for example, creation, update, or deletion of the specified cluster entity 156. At block 480, the host computer system may determine, responsive to the first operation, a second operation to be performed in the virtualization management system 102. The second operation may correspond to the first operation, and may include creating, updating, or deleting a virtualization management entity 106 associated with the specified cluster entity 156.

At block 490, the host computer system may send a command to the virtualization management system 102 (e.g., to the VS API 120) to perform the second operation for the virtualization management entity 106. Although particular first and second operations are described as being received and performed, any suitable first operation may be received, and any suitable second operation corresponding to the first operation may be performed. An operation may be associated with (e.g., performed on) any suitable type of entity in a containerized cluster or virtualization management system.

As an example, if a request to create a virtual machine was received at step 410, then block 440 may send a command to create a virtual machine in the containerized cluster. Block 470 may receive a notification indicating that the virtual machine has been created, and block 440 may send a command to the virtualization management system to cause the virtualization management system to update (or create, if not created at block 420) a virtual machine proxy entity that represents the virtual machine created in the containerized cluster. The update operation may, for example, change a state of the proxy entity to indicate that the proxy entity has been successfully associated with a cluster entity.

After performing block 490, the host computer system may repeat the sequence of blocks 460-490 to continue listening for and processing events. In this way, the method 400 may dynamically identify changes to the set of cluster entities in the containerized cluster and change the set of virtualization management entities accordingly to reflect the changes in the set of cluster entities. Although the method 400 does not necessarily stop after block 490, the method 400 may be stopped by, e.g., termination of a thread or process executing the method 400.

Figure 5:
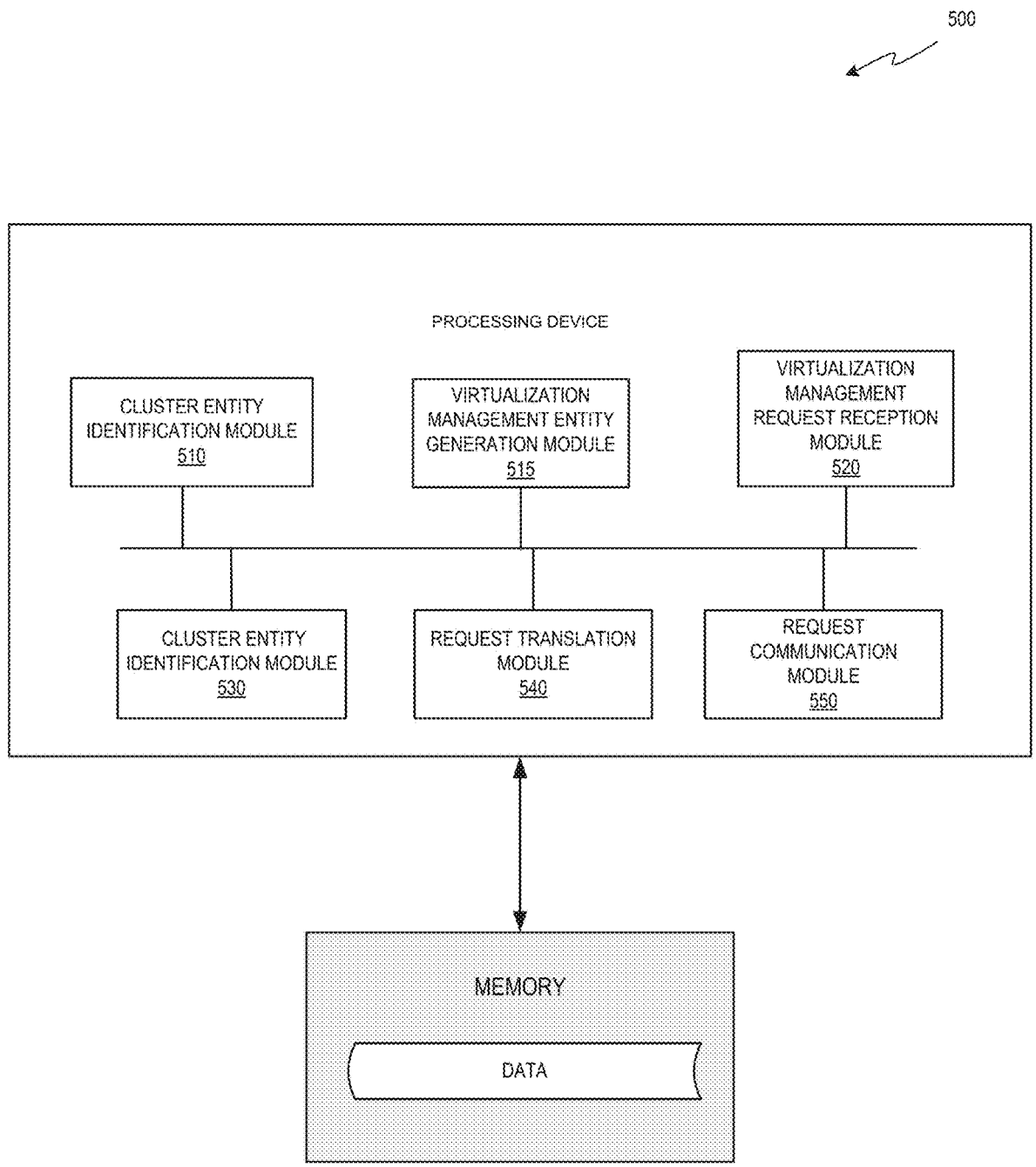
FIG. 5 depicts a block diagram of a computer system operating in accordance with one or more aspects of the present disclosure.

FIG. 5 depicts a block diagram of a computer system 500 operating in accordance with one or more aspects of the present disclosure. Computer system 500 may be the same or similar to host computer systems of the virtualization management system 102 or to host computer systems of the containerized cluster 150 of FIG. 1, and may include one or more processors and one or more memory devices. In the example shown, computer system 500 may include a cluster entity identification module 510, a virtualization management entity generation module 515, a virtualization management request reception module 520, a cluster entity identification module 530, a request translation module 540, and a request communication module 550.

Cluster entity identification module 510 may enable a processor to identify one or more cluster entities of a containerized computing cluster. The containerized computing cluster may include a plurality of virtual machines running on one or more host computer systems. A cluster entity may be, for example, one or more of a virtual machine, a host computer system, a virtual machine template, a disk, a persistent volume (PV), or a persistent volume claim (PVC).

Virtualization management entity generation module 515 may enable the processor to generate one or more virtualization management entities in the virtualization management system. Each virtualization management entity may be in the virtualization management system and may represent a respective cluster entity of the containerized cluster. The respective cluster entity may be in the containerized computing cluster.

The processor may generate a virtualization management cluster that corresponds to the containerized computing cluster, and the virtualization management entities may be associated with the virtualization management cluster. The virtualization management cluster may represent a cluster of host computing devices on which the virtualization management system runs. The processor may designate each of the virtualization management system entities as a proxy entity representing the associated cluster entity.

Virtualization management request reception module 520 may enable the processor to receive a request to perform an operation on a specified virtualization management entity in the virtualization management system. A virtualization management entity may be, for example, a virtualization node or a virtual disk.

Cluster entity identification module 530 may cause the processor to identify a cluster entity represented by the virtualization management entity. For example, the processor may use a previously-established association, such as a lookup table, between the virtualization management entity and the cluster entity to identify the cluster entity. Request translation module 540 may enable the processor to translate, responsive to the request, the request to one or more commands to be performed on the identified cluster entity of the containerized computing cluster.

Request communication module 550 may enable the processor to send the one or more commands to the containerized computing cluster. The processor may receive a request to create a virtualization management entity in the virtualization management cluster according to one or more specified parameters. The specified parameters may include, for example, a name to be used for the virtualization management entity and one or more entity-specific parameters, such as a memory size for a virtual machine entity, a network address for a virtual network entity, or the like. The processor may generate a command to create a cluster entity having the specified parameters in the containerized computing cluster and send the command to the containerized computing cluster. The processor may, responsive to receiving the request to create the virtualization management entity or responsive to the command to create the cluster entity, generate a proxy entity in the virtualization management system and associate the cluster entity with the proxy entity. The proxy entity may have the one or more specified parameters, which may, for example, be associated with the proxy entity when the proxy entity is created.

Figure 6:
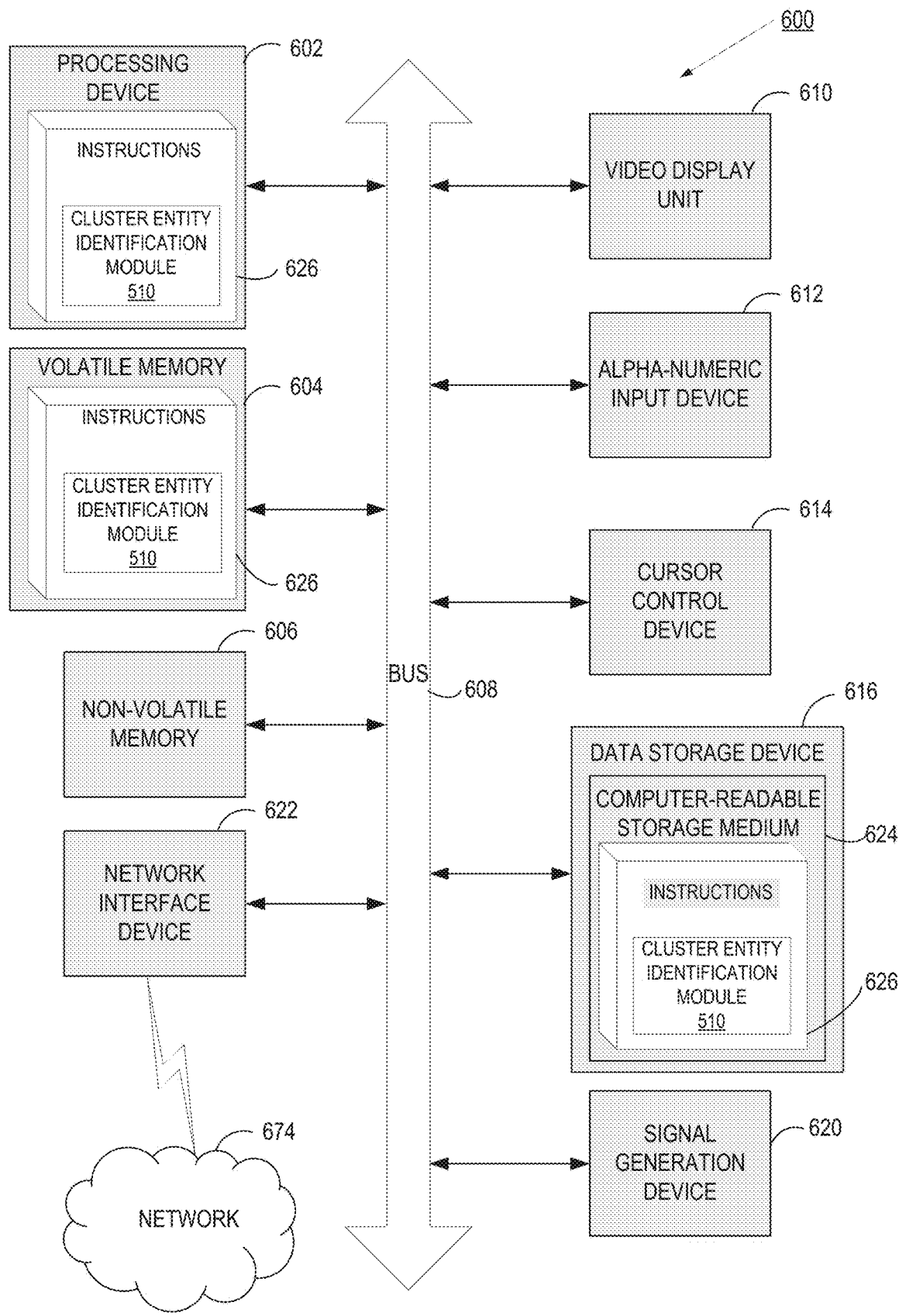
FIG. 6 depicts a block diagram of an example computer system operating in accordance with one or more aspects of the present disclosure.

FIG. 6 depicts a block diagram of a computer system operating in accordance with one or more aspects of the present disclosure. In various illustrative examples, computer system 600 may correspond to a host computer system of the virtualization management system 102 or of the containerized cluster 150 of FIG. 1, or to a host computer system of the virtualization management system 202 or of the containerized cluster 250 of FIG. 2. The computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing method 300 or 400 and for encoding components 510, 515, 520, 530, 540, and 550 of FIG. 5.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 or 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

generating, by a computing device, via a mediator of a virtualization management system, a specified virtualization management entity of the virtualization management system;

receiving, by the computing device, through an application programming interface (API) of the virtualization management system, a request to perform an operation on the specified virtualization management entity of the virtualization management system;

responsive to determining that the specified virtualization management entity is designated as a proxy entity, identifying, by the computing device, a cluster entity of a containerized computing cluster, wherein the cluster entity is represented by the specified virtualization management entity;

translating, by the computing device, via the mediator of the virtualization management system, responsive to the request, the request to one or more commands to be performed on the identified cluster entity of the containerized computing cluster, wherein translating the request comprises translating an identity of the specified virtualization management entity to an identity of the cluster entity, wherein the one or more commands include the identity of the cluster entity; and sending, by the computing device, the one or more commands to an API of the containerized computing cluster, wherein the API of the containerized computing cluster is different from the API of the virtualization management system.

2. The method of claim 1, wherein a cluster entity comprises one of: a cluster virtual machine, a cluster node, a cluster virtual machine template, a cluster network, or a cluster persistent volume claim (PVC), and the specified virtualization management entity comprises one of: a virtual machine proxy entity, a host proxy entity, a virtual machine template proxy entity, a network proxy entity, or a virtual disk proxy entity.

3. The method of claim 1, further comprising:

generating, by the computing device, a virtualization management cluster in the virtualization management system, wherein the virtualization management cluster represents the containerized computing cluster, wherein the specified virtualization management entity is associated with the virtualization management cluster.

4. The method of claim 3, further comprising:

receiving, by the computing device, a request to create a particular virtualization management entity in the virtualization management cluster according to one or more specified parameters;

responsive to receiving the request to create the particular virtualization management entity, generating, by the computing device, the proxy entity in the virtualization management system, the proxy entity having the one or more specified parameters;

generating, by the computing device, a command to create a cluster entity having the one or more specified parameters in the containerized computing cluster;

sending, by the computing device, the command to create the cluster entity to the containerized computing cluster; and associating, by the computing device, the cluster entity with the proxy entity.

5. The method of claim 1, further comprising:

receiving, by the computing device, one or more events from the containerized computing cluster, wherein each event specifies a first operation associated with a specified cluster entity of the containerized computing cluster, and the first operation comprises creation, update, or deletion of the specified cluster entity;

determining, by the computing device, responsive to the first operation, a second operation to be performed in the virtualization management system, wherein the second operation comprises creating, updating, or deleting a particular virtualization management entity associated with the specified cluster entity; and sending, by the computing device, a command to the virtualization management system to perform the second operation for the particular virtualization management entity.

6. The method of claim 1, further comprising:

generating, by the computing device, one or more virtualization management entities in the virtualization management system, wherein each of the virtualization management entities represent a respective particular cluster entity, and wherein generation the one or more virtualization management entities comprises:

associating each of the one or more virtualization management entities with the respective particular cluster entity in a data structure, and designating each of the one or more virtualization management entities as a proxy entity representing the respective particular cluster entity.

7. The method of claim 1, wherein identifying the cluster entity represented by the specified virtualization management entity comprises determining, by the computing device, that the specified virtualization management entity is associated with the identified cluster entity by a data structure, and wherein the cluster entity is in a containerized computing cluster that comprises a virtual machine running on a host system.

8. The method of claim 1, further comprising:

determining whether the specified virtualization management entity is designated as the proxy entity.

9. A system comprising:

a memory; and a processing device executing a transaction manager and operatively coupled to the memory, the processing device to:

generate, via a mediator of a virtualization management system, a specified virtualization management entity of the virtualization management system;

receive, through an application programming interface (API) of the virtualization management system, a request to perform an operation on the specified virtualization management entity of the virtualization management system;

responsive to determining that the specified virtualization management entity is designated as a proxy entity, identify a cluster entity of a containerized computing cluster, wherein the cluster entity is represented by the specified virtualization management entity;

translate, via the mediator of the virtualization management system, responsive to the request, the request to one or more commands to be performed on the identified cluster entity of the containerized computing cluster, wherein translating the request comprises translating an identity of the specified virtualization management entity to an identity of the cluster entity, wherein the one or more commands include the identity of the cluster entity; and send the one or more commands to an API of the containerized computing cluster, wherein the API of the containerized computing cluster is different from the API of the virtualization management system.

10. The system of claim 9, wherein a cluster entity comprises one of: a cluster virtual machine, a cluster node, a cluster virtual machine template, a cluster network, or a cluster persistent volume claim (PVC), and the specified virtualization management entity comprises one of: a virtual machine proxy entity, a host proxy entity, a virtual machine template proxy entity, a network proxy entity, or a virtual disk proxy entity.

11. The system of claim 9, wherein the processing device is further to:

generate a virtualization management cluster in the virtualization management system, wherein the virtualization management cluster represents the containerized computing cluster, wherein the specified virtualization management entity is associated with the virtualization management cluster.

12. The system of claim 11, wherein the processing device is further to:

receive a request to create a particular virtualization management entity in the virtualization management cluster according to one or more specified parameters;

responsive to receiving the request to create the particular virtualization management entity, generate the proxy entity in the virtualization management system, the proxy entity having the one or more specified parameters;

generate a command to create a cluster entity having the one or more specified parameters in the containerized computing cluster;

send the command to create the cluster entity to the containerized computing cluster; and associate the cluster entity with the proxy entity.

13. The system of claim 12, wherein the processing device is further to:

receive one or more events from the containerized computing cluster, wherein each event specifies a first operation associated with a specified cluster entity of the containerized computing cluster, and the first operation comprises creation, update, or deletion of the specified cluster entity;

determine, responsive to the first operation, a second operation to be performed in the virtualization management system, wherein the second operation comprises creating, updating, or deleting a virtualization management entity associated with the specified cluster entity; and send a command to the virtualization management system to perform the second operation for the virtualization management entity.

14. The system of claim 9, wherein the processing device is further to generate one or more virtualization management entities in the virtualization management system, wherein each of the virtualization management entities represents a respective particular cluster entity, and wherein to generate the one or more virtualization management entities, the processing device is further to:

associate each of the one or more virtualization management entities with the respective particular cluster entity in a data structure, and designate each of the one or more virtualization management entities as a proxy entity representing the particular cluster entity.

15. A non-transitory machine-readable storage medium storing instructions that cause a processing device to:

generate, via a mediator of a virtualization management system, a specified virtualization management entity of the virtualization management system;

receive, through an application programming interface (API) of the virtualization management system, a request to perform an operation on the specified virtualization management entity of the virtualization management system;

responsive to determining that the specified virtualization management entity is designated as a proxy entity, identify a cluster entity of a containerized computing cluster, wherein the cluster entity is represented by the specified virtualization management entity;

translate, via the mediator of the virtualization management system, responsive to the request, the request to one or more commands to be performed on the identified cluster entity of the containerized computing cluster, wherein translating the request comprises translating an identity of the specified virtualization management entity to an identity of the cluster entity, wherein the one or more commands include the identity of the cluster entity; and send the one or more commands to an API of the containerized computing cluster, wherein the API of the containerized computing cluster is different from the API of the virtualization management system.

16. The non-transitory machine-readable storage medium of claim 15, wherein a cluster entity one of: a cluster virtual machine, a cluster node, a cluster virtual machine template, a cluster network, or a cluster persistent volume claim (PVC), and the specified virtualization management entity comprises one of: a virtual machine proxy entity, a host proxy entity, a virtual machine template proxy entity, a network proxy entity, or a virtual disk proxy entity.

17. The non-transitory machine-readable storage medium of claim 15, wherein the instructions further cause the processing device to:

generate a virtualization management cluster in the virtualization management system, wherein the virtualization management cluster represents the containerized computing cluster, wherein the virtualization management entity is associated with the virtualization management cluster.

18. The non-transitory machine-readable storage medium of claim 17, wherein the instructions further cause the processing device to:

receive a request to create a particular virtualization management entity in the virtualization management cluster according to one or more specified parameters;

responsive to receiving the request to create the particular virtualization management entity, generate the proxy entity in the virtualization management system, the proxy entity having the one or more specified parameters;

generate a command to create a cluster entity having the one or more specified parameters in the containerized computing cluster;

send the command to create the cluster entity to the containerized computing cluster; and associate the cluster entity with the proxy entity.

19. The non-transitory machine-readable storage medium of claim 15, wherein the instructions further cause the processing device to:

receive one or more events from the containerized computing cluster, wherein each event specifies a first operation associated with a specified cluster entity of the containerized computing cluster, and the first operation comprises creation, update, or deletion of the specified cluster entity;

determine, responsive to the first operation, a second operation to be performed in the virtualization management system, wherein the second operation comprises creating, updating, or deleting a particular virtualization management entity associated with the specified cluster entity; and send a command to the virtualization management system to perform the second operation for the virtualization management entity.

20. The non-transitory machine-readable storage medium of claim 15, wherein the instructions further cause the processing device to generate one or more virtualization management system entities in the virtualization management system, wherein each of the virtualization management entities represents a respective particular cluster entity, and wherein to generate the one or more virtualization management entities, the instructions further cause to the processing device to:

associate each of the one or more virtualization management entities with the respective particular cluster entity in a data structure, and designate each of the one or more virtualization management entities as a proxy entity representing the respective particular cluster entity.

* * * * *